INVENTORS.
George R. Lay
Raymond P. Helling

ATTORNEY

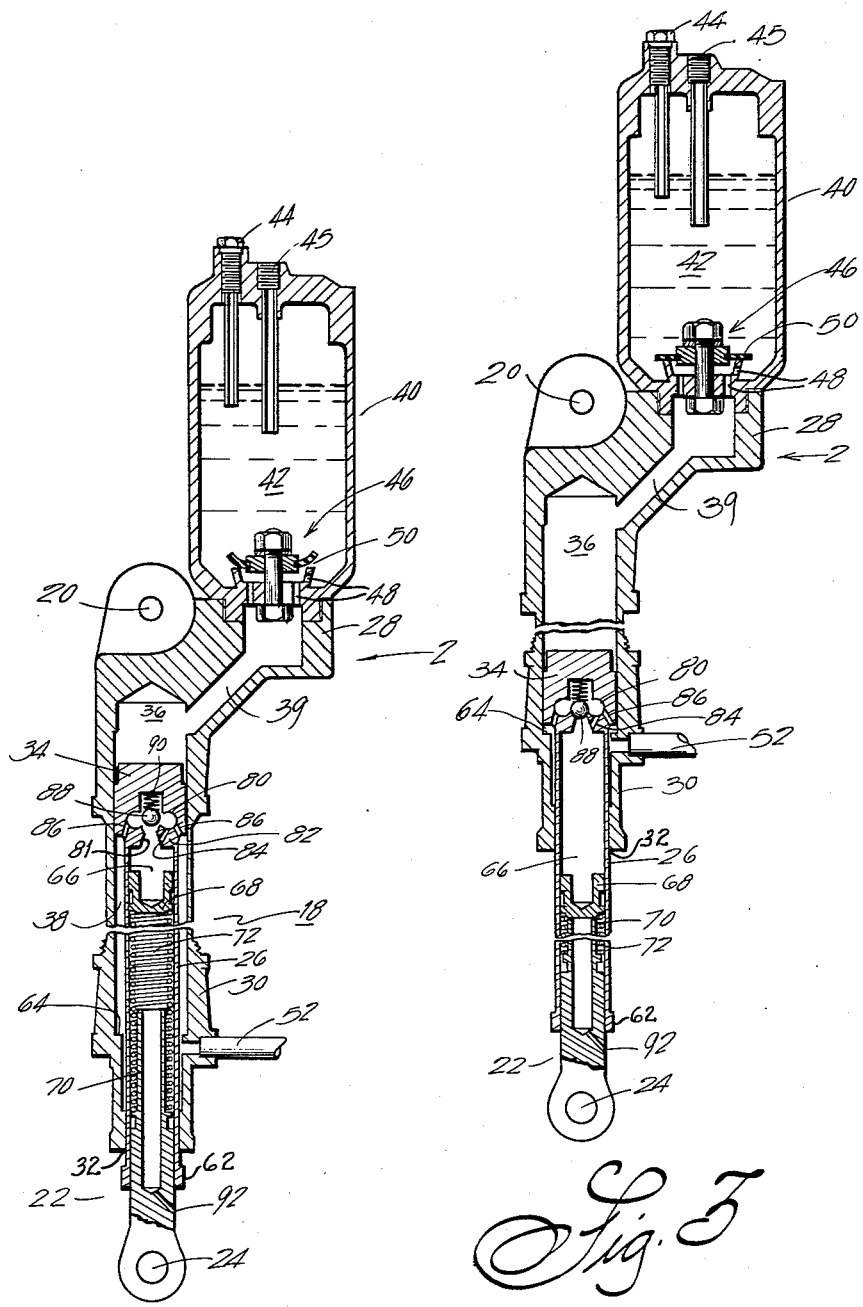

3,118,640
ARRESTING GEAR ACTUATOR WITH INTEGRAL
CAVITATION PREVENTION DEVICE
George R. Lay, Ferguson, and Raymond P. Helling, Florissant, Mo., assignors, by mesne assignments, to the United States of America as represented by the Secretary of the Navy
Filed Oct. 4, 1962, Ser. No. 228,506
5 Claims. (Cl. 244—110)

This invention relates to aircraft arresting gear.

To halt an aircraft on a short landing surface, a cable is stretched across the surface and arresting gear, including a hook, is installed on the aircraft. The hook, suspended from the aircraft, engages the cable and the aircraft's motion is arrested.

The hook is extended into position for engagement with cable and retracted therefrom by means of a cylinder and piston type actuator. Because the hook strikes the landing surface during an arrestment, the hook bounces and causes rapid retraction and re-extension of the actuator piston with great impact between the piston and cylinder. Frequently structural damage results. Cavitation or lack of cylinder fluid on the rod side of the piston is the cause of such impact.

It is an object of this invention to provide a new and improved arresting gear in which there is a minimum of cavitation and which thereby reduces impact loads due to rapid retraction and re-extension of the arresting hook.

It is also an object of this invention to provide an accumulator within the arresting hook actuator of such gear for eliminating cavitation, which does not require additional space, which provides for low friction loss fluid flow, which will fill with a normal retract-extend cycle and with an extend motion only.

Other objects and advantages will become apparent from the following description of the typical embodiment of the invention shown in the accompanying drawing, wherein:

FIG. 2 is a longitudinal cross sectional view of the actuator showing the position of elements when the arresting hook is retracted.

FIG. 3 is similar to FIG. 2 except that it shows the position of elements with the hook in the extended position.

Figure 1:
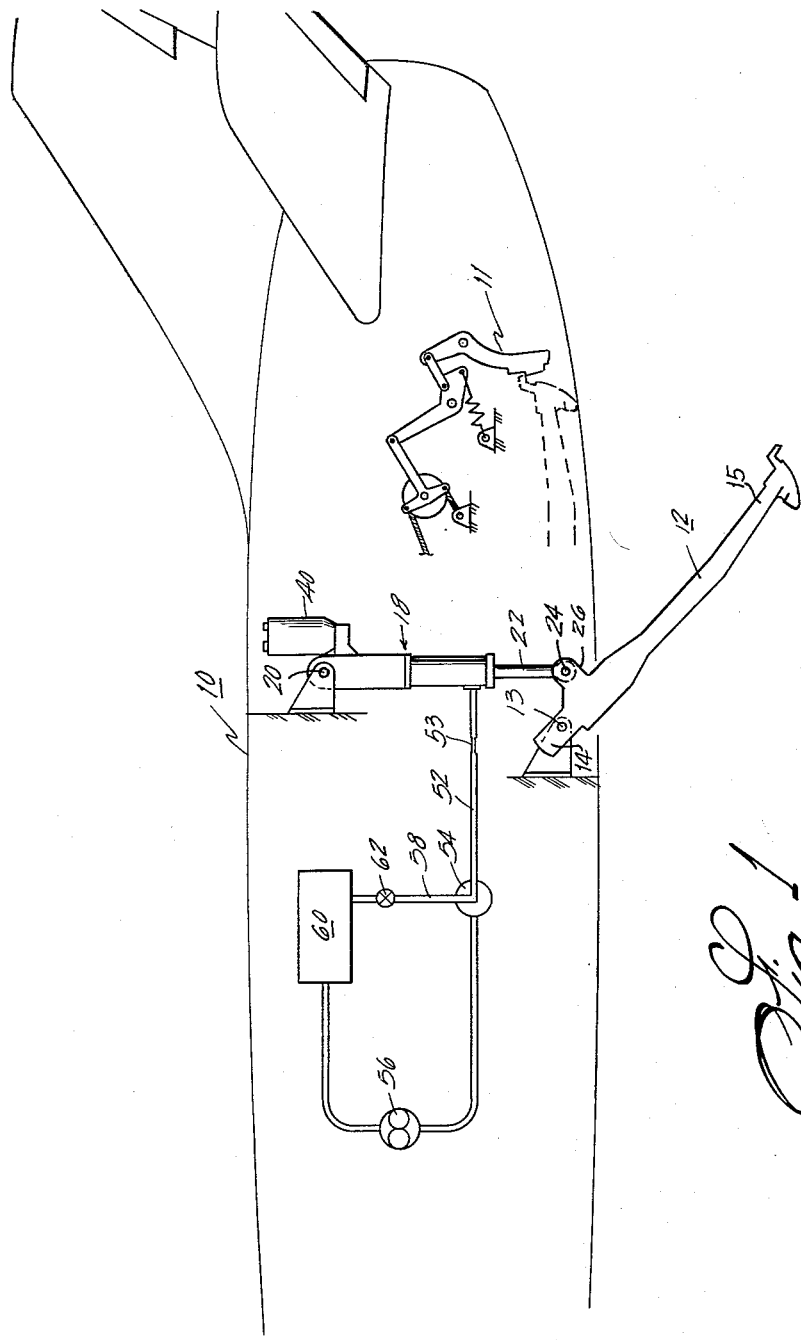
FIG. 1 is a schematic view of the arresting gear installed within an aircraft, a part of which is shown.

Referring to the drawing, FIG. 1, 10 indicates a portion of an aircraft fuselage in which the arresting gear incorporating the invention is installed. The arresting gear has a conventional arresting hook 12 hinged on a bolt 13 at its forward end, 14, to the underside of fuselage 10 and its free end has a hook portion 15 adapted to engage an arresting cable when the hook is in its lowered or extended position, which is downward and rearward of the aircraft as in FIG. 1, in a manner well understood in the art. Means, such as a latch 11, is used to hold hook 12 against the fuselage when not to be used for an arrestment. Force to move hook 12 about bolt or pivot, 13, is supplied from an actuator 18. The latter element is pivotally secured to support structure within the fuselage on a pivot 20 at its upper end. An end 22 of a piston rod 26, which is connected to the piston rod by threads, not shown, extends from its other or lower end and is pivotally joined by a bolt 24 to a lug 25 extending from hook 12 between its ends. Inward movement of the piston rod 26 retracts hook 12 upwardly against the bottom of fuselage 10 whereas, extension of the hook is accomplished with reverse motion of rod 26. The manner in which this is accomplished will be described hereafter.

Actuator 18 has a body 28, FIGS. 2 and 3, with a bore or cylinder 28 closed at the top and covered at the bottom by a cap 30 having an aperture 32. A piston 34 is reciprocably mounted within cylinder 28. Piston rod 26 projects from the bottom of piston 34, to which it is integrally secured, through cap aperture 32. Piston 34 divides bore or cylinder 28 into a hook-extend pressure chamber 36, above it, and a hook-retract pressure chamber 38, below it.

Fluid pressure enters the hook-extend pressure chamber 36 through a passage 39 that connects it with a flask 40 threaded into the top of body 28. Flask 40 contains a mixture of air and oil, 42, under pressure and is charged from a source, not shown, through a valved conduit 44. The pressure of the fluid is such that piston 34 will be moved down and hook 12 extended, when this is desired. A second conduit 45 adapted to be connected to a gauge, not shown, is provided for indicating the flask's pressure.

Fluid flow between flask 40 through passage 39 into the hook-extend chamber 36 is controlled by a valve 46. It includes a restricted orifice 48, through which fluid may pass at all times between the flask 40 and the hook-extend chamber 36, and a relief valve 50, annular in shape, which opens upwardly and permits flow only into the flask 40 from the chamber 36. Relief valve 50 is made of resilient material and has some adjusting means, as bolt 51, by which the force needed to open it may be varied.

A conduit 52 with a restriction 53, FIG. 1, communicatively connects the hook-retract chamber 38 through a three-way selector valve 54 with a source of high pressure hydraulic fluid 56, or, alternatively, with a return line 58 leading into a collecting tank 60. A check valve 62 is provided in the return line 58 to allow fluid flow only toward tank 60. Turning selector valve 54 so as to connect conduit 52 with pump 56 allows pressure to enter the hook-retract chamber 38. This is of sufficient force to overcome the pressure above piston 34, from flask 40, and move the piston upward, retracting hook 12. Turning selector valve 54 to connect the return line 58 with the hook-retract chamber 38, the fluid beneath piston 34 may pass into the collecting tank 60 under the force of the flask pressure on the top of piston 34.

Impact between the top of piston 34 and the top of the cylinder, or between the outside end face of cap 30 and stop flange 62, which may be provided as shown on piston rod 26 for the purpose, as when hook 12 is forcibly retracted with a bounce on the landing surface, is minimized by the effect of the relief valve 50 and orifice 48 in valve 46 through which fluid from the hook-retract chamber 36 must pass. The pressurized air-oil mixture 42 provides effective damping for absorbing the energy of the rising hook. The degree of damping may be varied with turning the relief valve adjusting bolt 51.

To prevent impact between the bottom of piston 34 and the inner end face 64 of the cylinder end cap 30, caused by forcible re-extension of the hook after a bounce that positions the hook out of contact with the landing surface, provision has been made to furnish sufficient fluid under piston 34 at the propitious times. For this purpose, piston rod 26 is hollowed to form within it a closed chamber or accumulator 66. A cup shaped, floating piston 68 is reciprocably mounted within accumulator 66, which accommodates it for sliding action, with its open end directed upwardly. A stop 70, tubular in form, is shown secured to the bottom of the accumulator for limiting the downward movement of the floating piston 68, and a spring 72 is mounted on stop 70 beneath floating piston 68 which normally urges the floating piston upwardly, urging the fluid from the accumulator.

Also, within the main piston, 34, there is a fluid chamber which may be termed a manifold 80 in that it provides several passageways between the accumulator 66 and retract chamber 38 for the flow of fluid. It is separated from the accumulator 66 by a wall 82. A restricted orifice 84 in wall 82 connects the accumulator 66 to the manifold 80 and orifices 86 and 86 communicatively join the manifold with the retract chamber 38 in the actuator body.

There is also another opening 81 in wall 82 between the manifold and accumulator, carrying a ball valve 88. A spring 90 in manifold 80 normally urges the ball valve 88 to a closed position to prevent fluid flow from manifold 80 to accumulator 66 by way of the valved opening 81 while permitting an opposite flow.

Gaskets, not shown, and vents, 92, may be provided as needed.

In the operation of the device, prior to a landing, latch 11, holding the arresting hook against the fuselage, is released and the selector valve 54 turned to permit fluid from the retract chamber 36 to flow through the return line 58 back to tank 60. The pressure in flask 40 then forces piston 34 to the bottom of cylinder 28 extending hook 12. Movement of piston 34 drives fluid from the retract chamber 38 into the storage tank 60. Some of the fluid, however, is forced through orifice 84 into the accumulator 66 causing floating piston 68 to bottom on stop 70 and compresses spring 72, FIG. 3.

When the arresting hook 12 strikes the landing surface, it is moved upward and piston 34 rises rapidly driving fluid from the extend chamber 36 into flask 40. Relief valve 50 is opened by the upward force. The compression of the fluid, 42, and metering through relief valve 50 prevents hook bounce and absorbs energy of a forceably retracted piston 34.

The rapid rise of piston 34 besides compressing fluid 42 creates a cavitational force in retract chamber 38. This force together with the force of spring 72 causes the floating piston 68 to move toward the top of the accumulator 66. The differential pressure created, between the retract chamber 38 and accumulator 66, causes the ball valve 88 to move off its seat and allow fluid to flow past it with a minimum of restriction to enter the retract chamber 38.

When the hook has no contact with the landing surface, as when the airplane rises, hook 12 is rapidly re-extended. However, the fluid in the retract chamber 38, which had been driven from the accumulator 66, acts as a snubber by metering the fluid through the orifice 84 into the accumulator 66, the ball valve 88 being seated, closes the orifice 81.

To retract the arresting hook 12, pump 56 is started and the selector valve 54 is turned to permit fluid flow from the pump into the retract chamber 38. This pressure drives piston 34 upward overcoming the pressure from flask 40 whereby hook 12 is retracted. Hook 12 is then latched, pump 56 turned off, and the three-way valve 54 turned to allow flow into tank 60.

Obviously many modifications and variations of the invention are possible in the light of the above teaching. It is, therefore, to be understood that within the scope of the appended claims the invention may be practiced otherwise than as specifically described.

What is claimed is:

1. In an arresting gear for aircraft having a hook member articulately secured to said aircraft for movement between extend and retract positions, an actuator for moving said member between said positions comprising a body adapted for mounting to said aircraft having a bore, a piston reciprocably disposed in and dividing said bore into extend and retract fluid chambers, a rod joined to said piston for movement therewith and extending through said retract chamber and body and pivotally secured to said hook member, a source of pressurized fluid, fluid passage means connecting said source and said extend chamber for fluid flow therebetween, check valve means connected to permit passage of fluid from said extend chamber to said source of pressurized fluid, a source of fluid connected to said retract chamber, said rod having a fluid accumulator, fluid passage means connecting said retract chamber to said accumulator, second check valve means connected for passage of fluid from said accumulator into said retract chamber, and means urging fluid from said accumulator into said retract chamber.

2. The device of claim 1 wherein said last named means includes a floating piston reciprocably mounted in said accumulator and resilient means urging said floating piston to expel fluid from said accumulator.

3. The device of claim 2 wherein said second check valve means is a resiliently urged ball valve.

4. The device of claim 3 wherein said source of fluid connected to said retract chamber includes a fluid tank, a pump and three-way valve connected to permit flow from said pump to said retract chamber or therefrom into said tank.

5. In an arresting gear for aircraft having a hook member articulately secured to said aircraft for movement between extend and retract positions, an actuator body pivotally secured to said aircraft and having a bore, a piston in said bore, a rod extending from said piston through said body and pivotally secured to said hook member, a source of pressurized air connected to apply pressure to one end of said piston and extend said hook member, a source of fluid pressure connected to supply pressure to the other end of said piston and retract said hook member, check valve means connected to permit flow of fluid from said one end of said piston, an accumulator in said rod, passage means connecting said accumulator to said bore at the other end of said piston to permit fluid flow thereto, and resilient means urging fluid from said accumulator into said bore at the other end of said piston.

References Cited in the file of this patent

UNITED STATES PATENTS

| | | |
|---|---|---|
| 2,443,730 | Gruss | June 22, 1948 |
| 2,668,031 | Martin | Feb. 2, 1954 |
| 2,922,603 | Smith | Jan. 26, 1960 |
| 3,011,777 | Stout | Dec. 5, 1961 |